(12) United States Patent
Näsström

(10) Patent No.: US 9,505,194 B2
(45) Date of Patent: Nov. 29, 2016

(54) PANEL STRUCTURE AND PRODUCTION METHOD

(75) Inventor: Kaj Tommy Näsström, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 465 days.

(21) Appl. No.: 13/996,479

(22) PCT Filed: Dec. 21, 2010

(86) PCT No.: PCT/SE2010/051450
§ 371 (c)(1),
(2), (4) Date: Oct. 16, 2013

(87) PCT Pub. No.: WO2012/087203
PCT Pub. Date: Jun. 28, 2012

(65) Prior Publication Data
US 2014/0127528 A1    May 8, 2014

(51) Int. Cl.
*B32B 7/04* (2006.01)
*E04C 2/08* (2006.01)
(Continued)

(52) U.S. Cl.
CPC ............. *B32B 7/045* (2013.01); *B32B 3/06* (2013.01); *B32B 3/12* (2013.01); *B32B 3/266* (2013.01); *B32B 3/28* (2013.01); *B32B 3/30* (2013.01); *B32B 7/08* (2013.01); *B32B 15/01* (2013.01); *E04C 2/08* (2013.01); *E04C 2/365* (2013.01); *B32B 2307/50* (2013.01); *B32B 2307/54* (2013.01); *B32B 2307/544* (2013.01); *B32B 2307/546* (2013.01); *B32B 2307/558* (2013.01); *B32B 2307/56* (2013.01); *B32B 2307/714* (2013.01); *Y10T 29/49629* (2015.01); *Y10T 428/1234* (2015.01); *Y10T 428/12347* (2015.01)

(58) Field of Classification Search
None
See application file for complete search history.

(56) References Cited

U.S. PATENT DOCUMENTS 2,609,068 A * 9/1952 Pajak .................... E04C 2/365
101/382.1
3,086,624 A * 4/1963 Wyatt .................... B21D 47/00
156/205

(Continued)

FOREIGN PATENT DOCUMENTS

CA    2159244 C    6/1996
CA    2326243 A1   5/2001

(Continued)

OTHER PUBLICATIONS

International Search Report, Application No. PCT/SE2010/051450, Sep. 22, 2011.

(Continued)

*Primary Examiner* — Adam Krupicka
(74) *Attorney, Agent, or Firm* — Myers Bigel, P.A.

(57) ABSTRACT

A sandwich structure is provided that includes a core formed of profiled metal sheet material and a metal face sheet secured to at least one side of the core. Protrusions are provided in a pattern on at least one side of the core and apertures are provided in a pattern in each face sheet. Dimensions of the protrusions and apertures are such that the protrusions extend at least partially through the apertures of the associated face sheet and are secured thereto. A method for producing such a sandwich structure is also provided.

8 Claims, 9 Drawing Sheets

(51) Int. Cl.
*E04C 2/36* (2006.01)
*B32B 15/01* (2006.01)
*B32B 3/12* (2006.01)
*B32B 3/26* (2006.01)
*B32B 7/08* (2006.01)
*B32B 3/06* (2006.01)
*B32B 3/28* (2006.01)
*B32B 3/30* (2006.01)

(56) References Cited

U.S. PATENT DOCUMENTS

| | | | |
|---|---|---|---|
| 3,552,086 A | | 1/1971 | Allen et al. |
| 3,673,057 A | | 6/1972 | Fairbanks |
| 3,769,767 A | * | 11/1973 | Scott ............ E04C 2/365 181/288 |
| 4,411,381 A | * | 10/1983 | Ittner ............ B21D 21/00 228/173.7 |
| 2002/0106490 A1 | | 8/2002 | Wagenblast |
| 2004/0197519 A1 | * | 10/2004 | Elzey ............ B32B 3/28 428/68 |
| 2009/0053476 A1 | | 2/2009 | Conner et al. |

FOREIGN PATENT DOCUMENTS

| | | |
|---|---|---|
| DE | 4439159 A1 | 5/1996 |
| WO | WO 2010/069363 A1 | 6/2010 |

OTHER PUBLICATIONS

Written Opinion of the International Searching Authority, Application No. PCT/SE2010/051450, Sep. 22, 2011.
Supplementary European Search Report, European Application No. EP 10 86 0891, mailed on Jun. 23, 2014, 5 pages.
International Preliminary Report on Patentability, Application No. PCT/SE2010/051450, Jun. 25, 2013.

* cited by examiner

A-A

*FIG. 6*
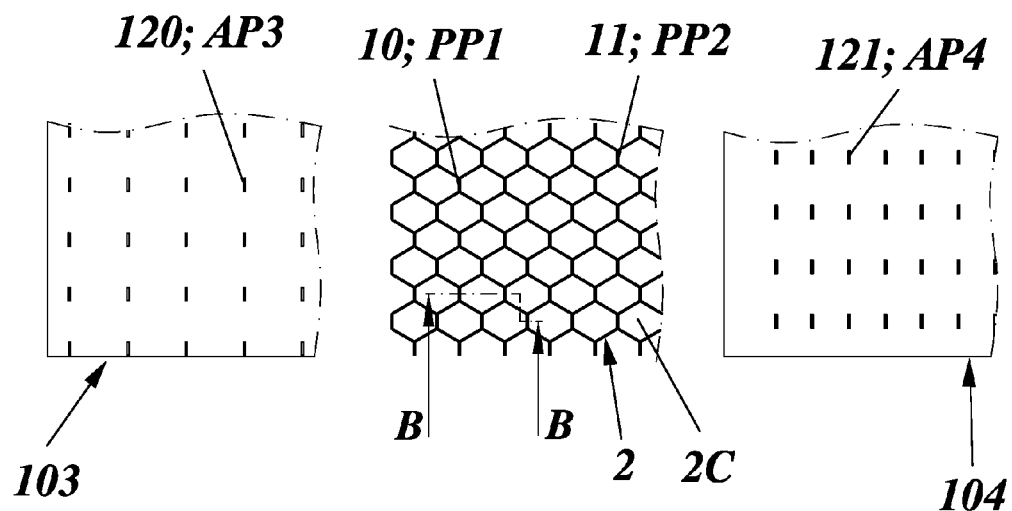
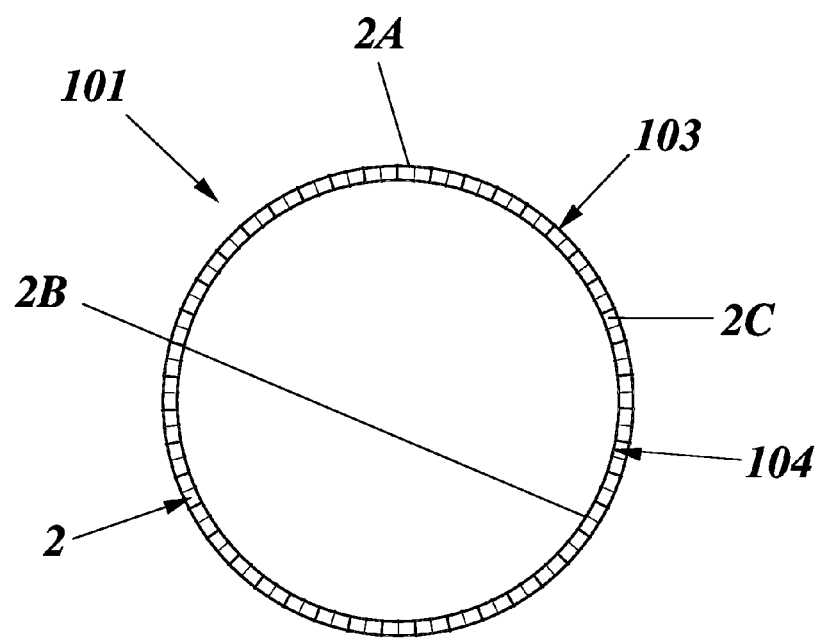
*FIG. 5*

B-B

C-C

D-D

E-E

PANEL STRUCTURE AND PRODUCTION METHOD

CROSS REFERENCE TO RELATED APPLICATION

This application is a 35 U.S.C. §371 national stage application of PCT International Application No. PCT/SE2010/051450, filed on 21 Dec. 2010, the disclosure and content of which is incorporated by reference herein in its entirety. The above-referenced PCT International Application was published in the English language as International Publication No. WO 2012/087203 A1 on 28 Jun. 2012.

TECHNICAL FIELD

The present invention generally concerns panel structures having a core of a profiled material forming open cells or channels and a face sheet or skin secured to at least one side of the core and also concerns methods for producing such panel structures.

BACKGROUND

Sandwich panels consist of a lightweight core and a face layer or sheet secured to each side of the core or to only one side thereof (so called semi-sandwich panels) and are well known within many technical fields. Such panels are generally used mainly for their excellent strength and stiffness in relation to the low overall weight and in certain designs also for the very good shock-absorbing qualities. The low weight is obtained by means of the low density of especially the core material that may consist of multiple closed cells containing air or other material.

The most common materials used for the face layers are metal, plastic or fiber composite. The core material is usually produced of metal or other non organic low density material forming small or big regular or irregular cells. In cases where the different metal and/or other non-organic layers are pre-manufactured from material hardened prior to their assembly there is traditionally only one way of producing the sandwich structure or panel, and that is to glue the layers together. Such sandwich panels in which organic materials, polymer materials or other synthetic materials are used as adhesive between the layers, of e.g. metal, are restricted in their fields of application. In particular, they will in most cases not withstand aggressive chemicals or high temperatures very well.

However, sandwich materials containing only synthetic material have lately become more frequent. The manufacturing processes used to produce many of such commonly employed sandwich panels consisting of synthetic material in both surface layers and in the core, especially composite sandwich panels, are still mostly manual and thereby rather expensive. The sizes of such sandwich structures/panels that can be practically produced are mainly restricted to the sizes of autoclaves that are conventionally used for pressing the layers together and for hardening the panels.

SUMMARY

A general object of the present invention is to provide a solution to the described problems.

A particular object of the invention is to suggest an improved all-metal sandwich structure.

In particular, another object of the invention is to suggest an improved method of producing an all-metal sandwich structure.

These and other objects are met by embodiments defined by the accompanying claims.

The invention generally relates to sandwich structures of the kind having a core of profiled metal sheet material and a metal face sheet secured to at least one of two sides of the core. In a basic configuration protrusions are provided in a predetermined pattern on a side or on each side of the core and apertures are provided in a predetermined pattern in the single metal face sheet or each metal face sheet. The protrusions and apertures are provided with such dimensions that the protrusions extend at least partially through the apertures of the associated face sheet or sheets and are secured thereto.

In another aspect the invention generally relates to a method of producing a sandwich structure that includes a core of profiled metal sheet material and a metal face sheet secured to one or each of two sides of the core. In a basic configuration the method involves forming protrusions in a predetermined pattern on one or each side of the core and forming apertures with dimensions exceeding those of the protrusions and in a predetermined pattern in the single metal face sheet or each metal face sheet. A face sheet is applied to the side or each side of the core so that protrusions of the core are at least partially extended through apertures of the associated face sheet and then the protrusions are secured to the associated face sheet.

The basic inventive configurations present the advantages of:
- all-metal design providing easy scrapping;
- allowing for very strong bonding between the layers by welding or brazing;
- enabling stainless steel configuration providing anti-corrosion advantages;
- enabling practical, continuous and inexpensive all-metal production;
- high temperature and chemical durability; and
- environmentally friendly by requiring less material to obtain specific rigidity.

Preferred further developments of the basic inventive idea as well as embodiments thereof are specified in the dependent subclaims.

Advantages offered by the present invention, in addition to those described, will be readily appreciated upon reading the below detailed description of embodiments of the invention.

BRIEF DESCRIPTION OF THE DRAWINGS

The invention and its further objects and advantages will be best understood by reference to the following description taken together with the accompanying drawings, in which:

FIG. 5 is a schematical end view of a second exemplary embodiment of a cylindrically formed sandwich structure of the invention;

FIG. 6 is a partial and schematical illustration similar to that of FIG. 2 of the component parts of the cylindrical sandwich structure of FIG. 5, prior to assembly;

DETAILED DESCRIPTION

Figure 1:
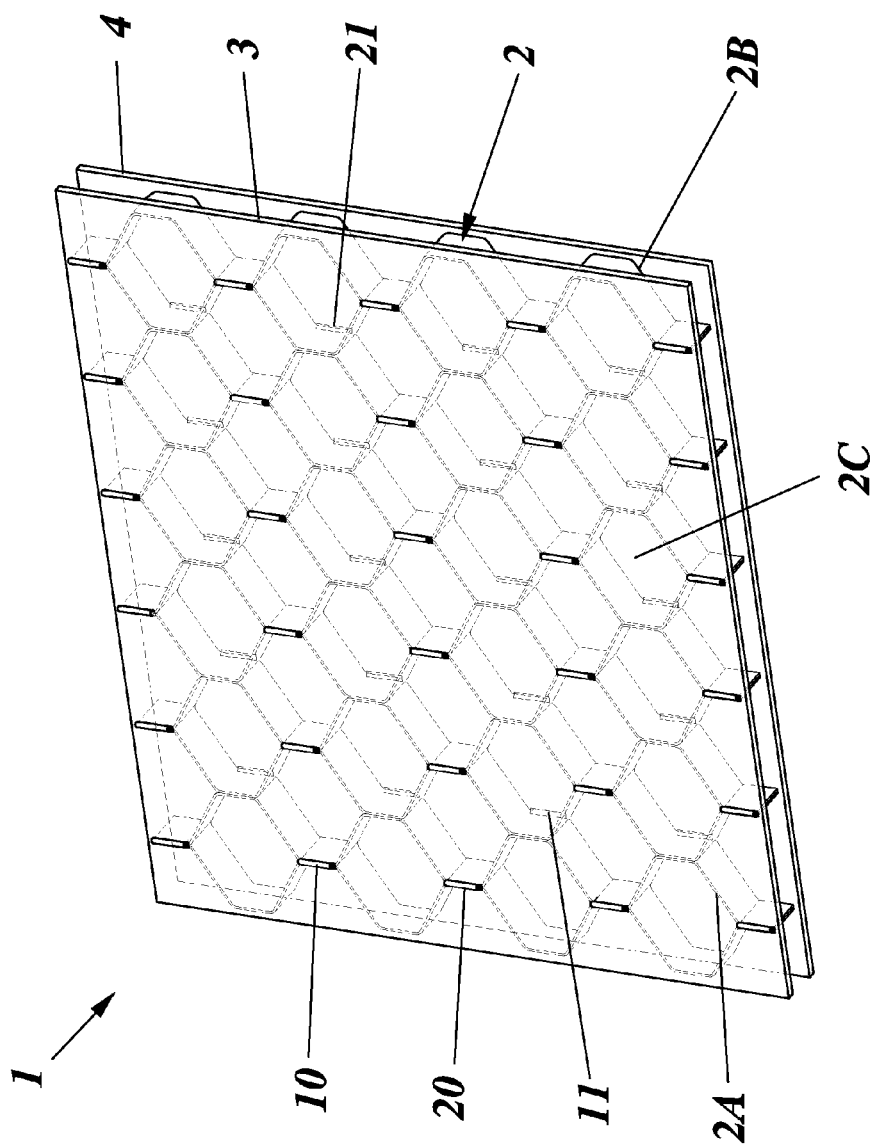
FIG. 1 is a perspective view of a sandwich structure panel according to a first exemplary embodiment of the invention.
Figure 2:
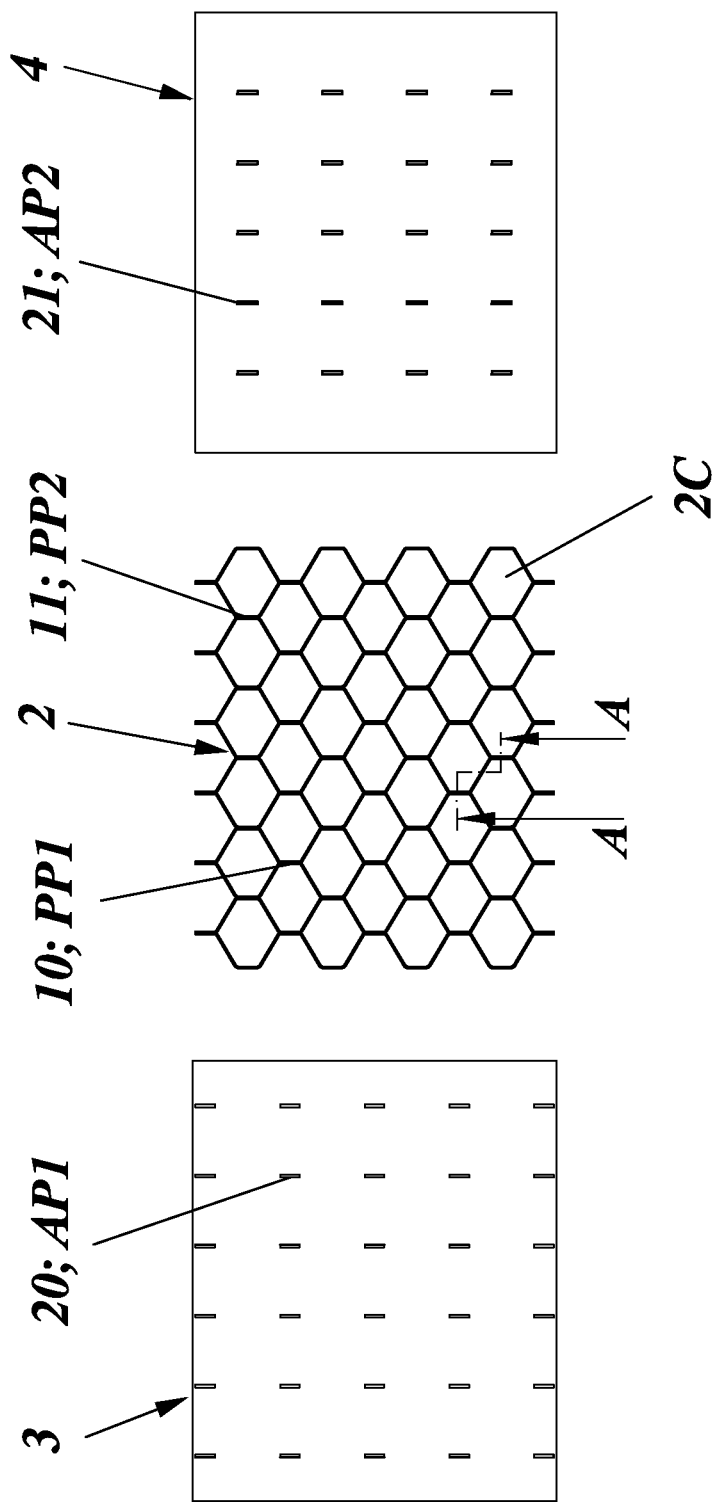
FIG. 2 is a schematical illustration of the component parts of the sandwich panel of FIG. 1, prior to assembly.
Figure 3:
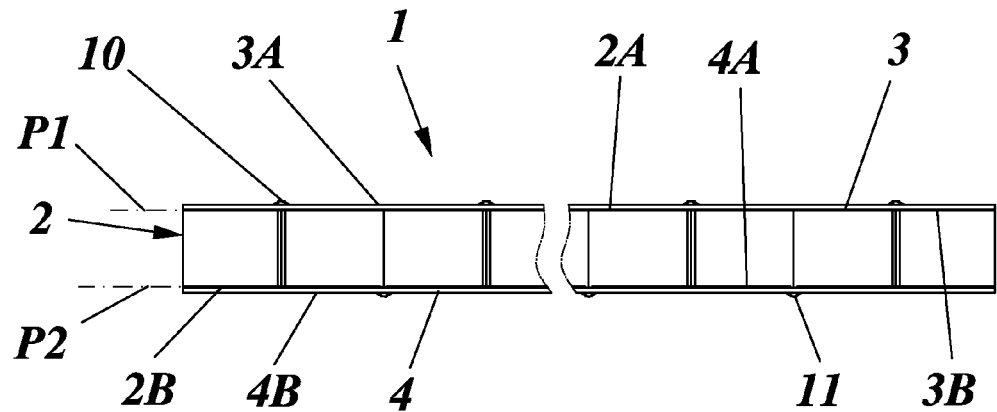
FIG. 3 is a partial side view of the sandwich panel of FIG. 1.
Figure 4:
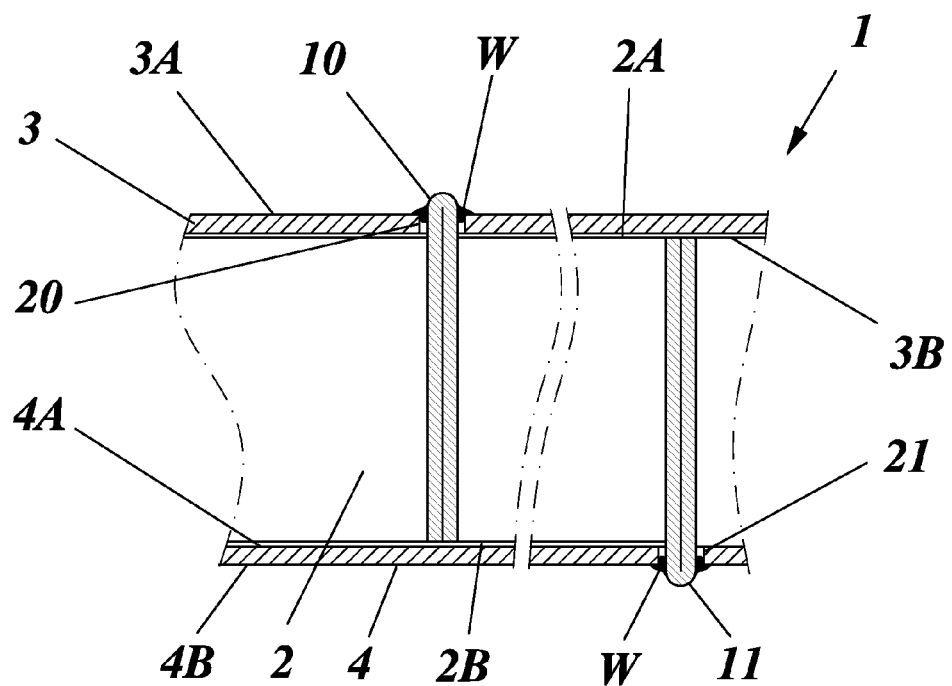
FIG. 4 is a partial section through the assembled panel of FIG. 1, taken in planes A-A positioned as indicated in FIG. 2.

The invention will be explained with reference to exemplifying embodiments of sandwich structures and panels that are illustrated in the accompanying drawing FIGS. 1-13B. It is emphasized that these illustrations have the single purpose of describing exemplary embodiments of the invention and are not intended to limit the invention to the details thereof. Said embodiments relate to an application of the inventive solution to a general sandwich structure that is not intended for use in any specific field of application or for any specific purpose. However, it shall be stressed that the inventive solution may be used for sandwich structures that are intended for specific applications and that therefore require special additional features appropriate for such an application, such as different core configurations than those described herein. It shall thus be realized that the invention likewise covers the incorporation of such specific application related features as well as any appropriate combination of features disclosed for the different embodiments described herein.

It has been realized that the presently available sandwich structures are all produced with one or several unwanted restrictions, as was indicated in the introduction. Either the panels are manufactured from synthetic materials which means that they may only be produced in restricted sizes. This is manly due to the practical dimensional limitations set by the manufacturing equipment, normally a heating oven, a press or most commonly an autoclave in which the panels are cured in their final shape by applying elevated temperature and pressure. Currently it is also fairly common to use so called out-of-autoclave technology (OOA) using vacuum pressure to configure and produce composite sandwich panels. The elimination of the need for an expensive autoclave for the production brings about a considerable reduction of the production costs, but the dimensional limitations are similar. In this case the size of produced panels is limited by the practical dimensions of the vacuum pressure chamber. Like in the autoclave production the panels also require a considerable dwell time to cure in the vacuum pressure chamber. A continuous production is therefore presently not possible for composite sandwich panels.

In an attempt to overcome the disadvantages and problems with the known techniques for sandwich structure fabrication, the present invention suggests a technique that enables the manufacturing of all-metal sandwich panels that are joined together by welding, brazing or soldering. With the technique suggested by the invention it will be possible to produce sandwich structures that may withstand high temperatures and aggressive media while simultaneously maintaining comparatively low fabrication costs. This is partly due to the fact that by means of the invention sandwich structures may be produced continuously, in running length without dimensional restriction. The inventive solution provides further advantageous improvements that are achieved through the versatility obtained by using the all-metal components when it comes to the shaping of the finished product. To achieve this, the invention basically uses the unique concept of employing a core having protrusions protruding over a reference surface and being provided in a predetermined pattern for accommodating and cooperating with correspondingly distributed surface layer or face sheet apertures.

The invention will be explained below with reference to exemplifying embodiments thereof that are illustrated in the accompanying drawing FIGS. 1 to 13B. In drawing FIGS. 1-4, 5-7 and 8-11, respectively, are first disclosed three very schematical embodiments of the inventive solution, in which a particular honeycomb structure is used for the core material. Said honeycomb core material is one particularly appropriate example of a core base material having a semi-open structure with adjoining tubular cells. The advantage of said material is that in its fabrication it is formed with integral protrusions provided in regular patterns on each side of the material. The honeycomb material as well as a method for its production are described in our International PCT-application No. WO/2010/069363. Such a material may be used with great advantage, but the invention is by no means restricted to the use thereof but covers the use of any appropriate present or future core material.

In FIGS. 1-4 is illustrated a first exemplary embodiment of a sandwich structure 1 to which the basic concept of the invention has been applied. In particular, FIG. 1 illustrates a sandwich panel 1 of generally flat configuration, which for practical reasons has been shown with restricted overall dimensions although the invention lends itself to the described continuous production in running length. The sandwich panel 1 includes a core 2 of profiled metal sheet material forming upper and lower sides 2A, 2B each defining a reference plane P1 and P2, respectively, for the engagement with a lower 3B and upper 4A side, respectively, of an associated metal face sheet 3, 4 that is secured to a corresponding side of the core 2. This is the conventional configuration for a honeycomb type sandwich panel.

In addition to the conventional configuration the core 2 of the exemplary embodiment of the invention has protrusions 10, 11 provided in a predetermined pattern PP1 and PP2, respectively. The protrusions 10, 11 are provided distributed over an area, preferably a major area, on each side 2A, 2B of the core 2. As was indicated above, said protrusions 10, 11 are in the given example formed automatically, as a result of the folding of an integral sheet onto or towards itself along transversal folding lines during fabrication of the honeycomb material of WO/2010/069363.

Each of the metal face sheets 3, 4 has apertures 20, 21 provided in a predetermined pattern AP1, AP2 over a corresponding, appropriate area of the sheet. The dimensions of the protrusions 10, 11 and apertures 20, 21 are adapted to each other and specifically the dimensions of the apertures 20, 21 at least slightly exceed those of the protrusions, allowing the protrusions 10, 11 to be extended at least partially through the apertures 20, 21 of the associated face sheet 3, 4. Therefore the protrusions on each side of the core and the apertures of the associated face sheet are provided equally distributed in their respective patterns. This enables easy fitting of the face sheets to associated core sides with the protrusions accommodated in the apertures. As will be described further below this fact does not preclude the use of unequal protrusion and aperture patterns for the different sides of the core, as long as the patterns for flat panels are complementary for cooperating core sides and face sheets.

The protrusions 10, 11 of the two sides 2A, 2B of the core 2 are secured to the corresponding sheets 3, 4 on outer, upper 3A and lower 4B sides of the face sheets 3 and 4, respectively. The core 2 protrusions 10, 11 may be secured to the associated face sheet 3, 4 by the schematically illustrated welded, brazed or soldered joints W formed at the outer sides 3A, 4B of the respective face sheets 3, 4. In a variation of the ordinary welded, brazed or soldered joint W illustrated in FIGS. 3 and 4, a joint W' may according to a practical example shown in FIG. 11 also be formed by melting at least the part of a protrusion 10' extending past the upper side 3A of the face sheet 3 into the corresponding, surrounding aperture 20. In this way the outer sides of the panels may be kept essentially continuous and flat after assembly.

In the exemplary embodiment of FIGS. 1-4 the core 2 consists of an open cell material having cells 2C that are all open towards both sides 2A, 2B of the core 2 and that are closed at said sides by the corresponding face sheet 3, 4. The cells 2C may be empty but may for specific applications be filled with gaseous or cellular material for providing specific features, such as improved shock absorbance.

With the core 2 being formed in the exemplified manner, by the integrally bent sheet material, the protrusions 10, 11 will on both sides 2A, 2B be provided in the same evenly distributed pattern PP1, PP2 with uniform mutual distances between individual protrusions 10, 11. As a result thereof, the apertures 20, 21 are likewise provided in generally the same evenly distributed patterns AP1, AP2 in which the mutual distances between individual apertures 10, 11 are likewise uniform and adapted to the protrusion distances. However, in alternative embodiments where the protrusions may be formed or attached separately, the protrusion patterns may be irregular and may vary from side to side. It is only required that, for flat sandwich panel structures, the aperture patterns of the face sheets are adapted to the protrusion pattern of the associated core side. Expressed otherwise, in a face sheet 3, 4 and in the associated side 2A, 2B of the core 2, the apertures 20, 21 and protrusions 10, 11 are generally equally spaced and distributed in said respective protrusion and aperture patterns PP1, PP2 and AP1, AP2, respectively.

Figure 7:
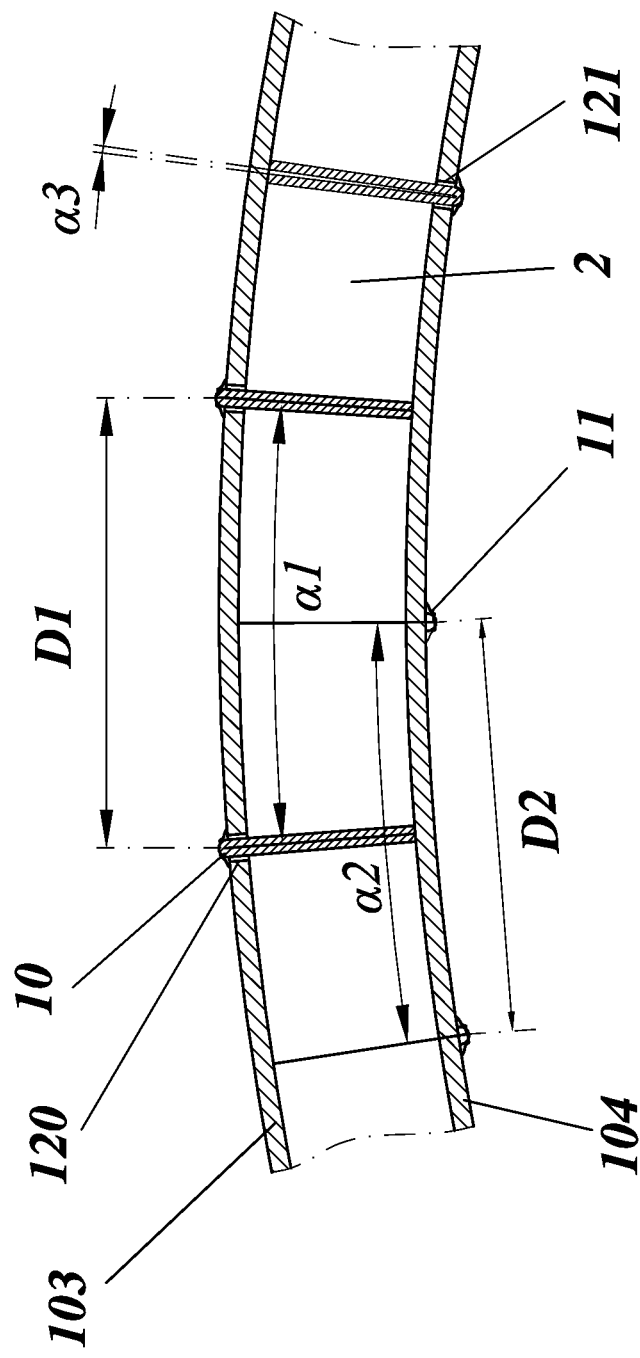
FIG. 7 is a partial cross section through the cylindrical sandwich structure of FIG. 5, taken in planes B-B positioned as indicated in FIG. 6.
Figure 8:
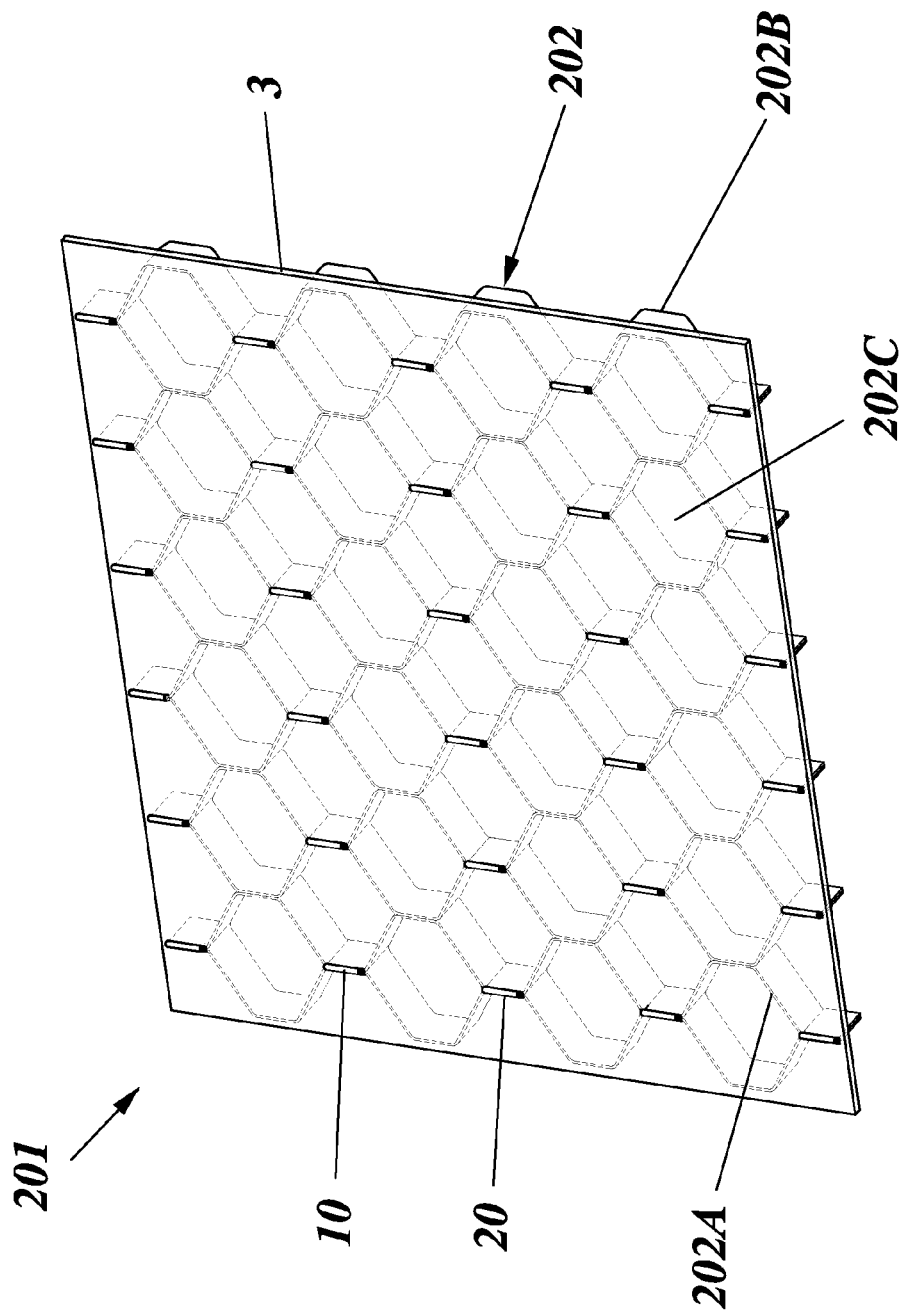
FIG. 8 is a perspective view of a sandwich structure according to a third exemplary embodiment of the invention.
Figure 9:
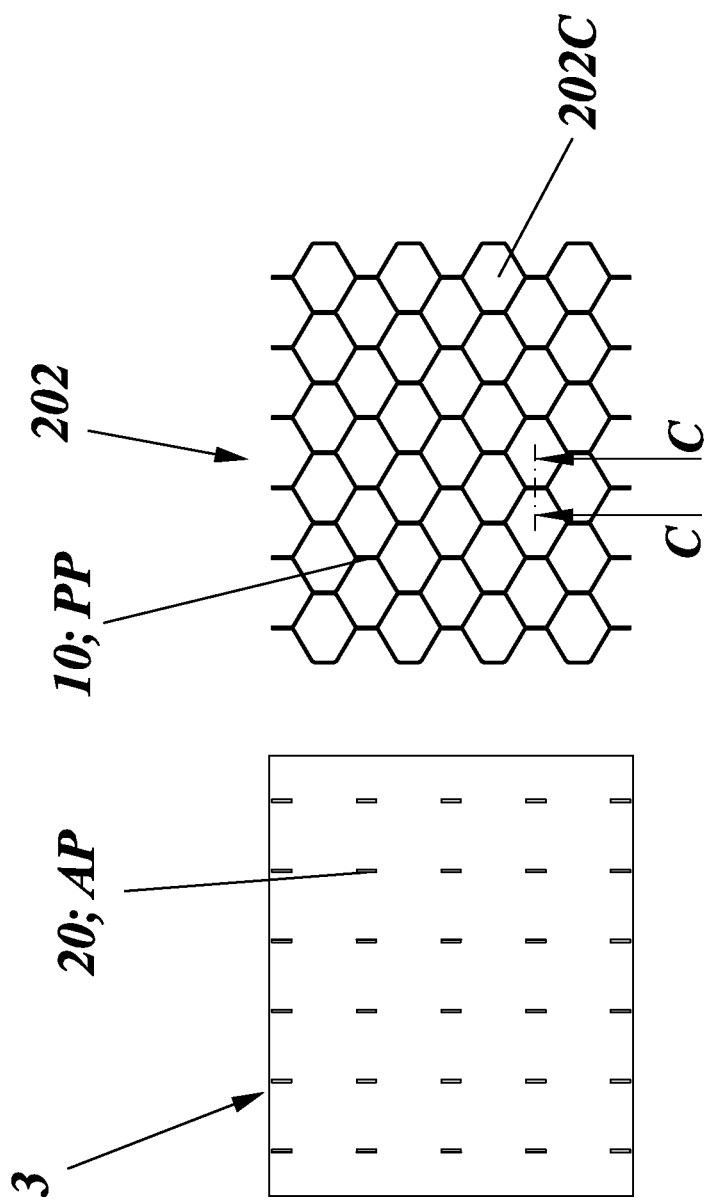
FIG. 9 is a schematical illustration, likewise similar to that of FIG. 2, of the component parts of the sandwich panel of FIG. 8, prior to assembly.
Figure 10:
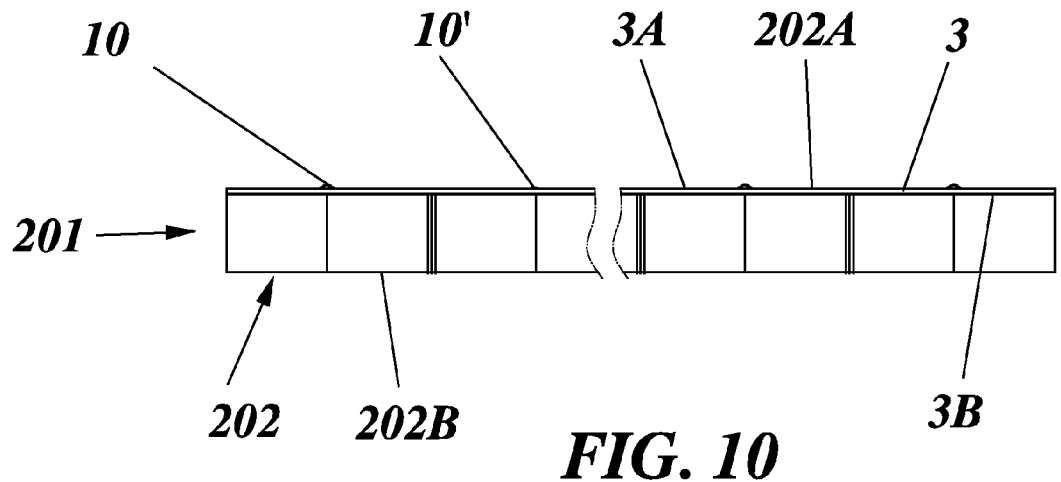
FIG. 10 is a partial side view of the sandwich panel of FIG. 8.
Figure 11:
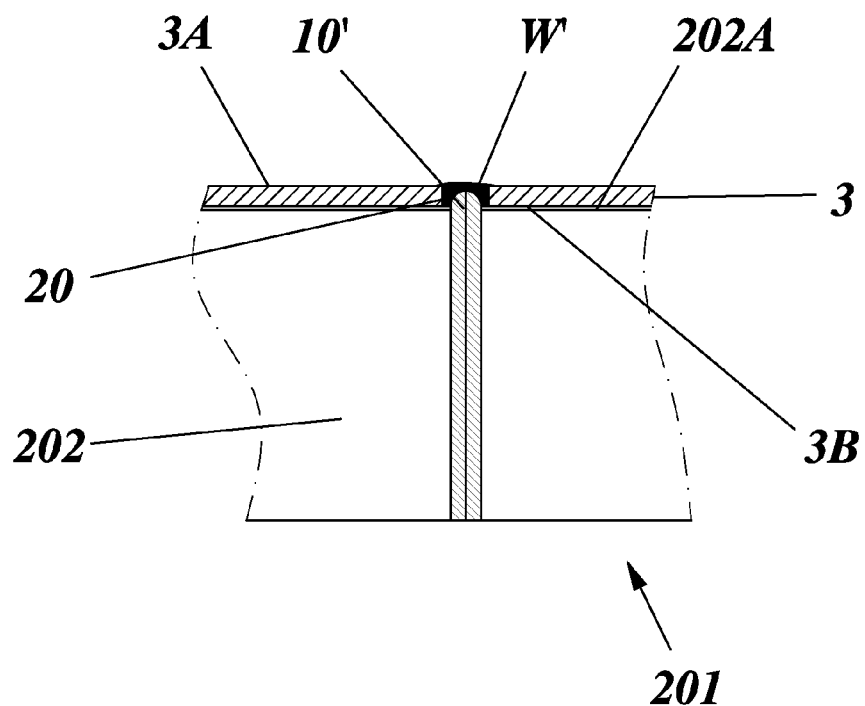
FIG. 11 is a partial section through the assembled panel of FIG. 8, taken in a plane C-C positioned as indicated in FIG. 9.
Figure 12A:
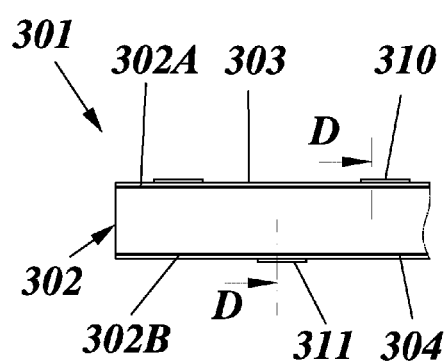
FIG. 12A is a partial side view of a sandwich structure panel according to a forth exemplary embodiment of the invention.
Figure 12B:
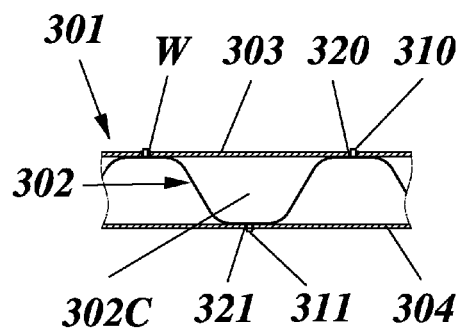
FIG. 12B is a partial section through the sandwich panel of FIG. 12A, taken in planes D-D positioned as indicated in FIG. 12A.
Figure 13A:
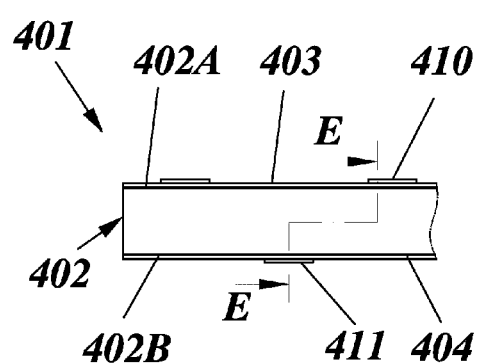
FIG. 13A is a partial side view of a sandwich structure panel according to a fifth exemplary embodiment of the invention.
Figure 13B:
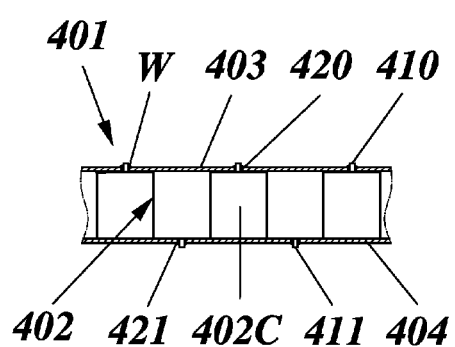
FIG. 13B is a partial section through the sandwich panel of FIG. 13A, taken in planes E-E positioned as indicated in FIG. 13A.

In FIGS. 5-7 is illustrated a second exemplary embodiment of an inventive sandwich structure 101 having a cylindrical configuration. For this embodiment has been used the same type of honeycomb core material 2 as that of the first embodiment, namely a core 2 having protrusions 10, 11 that in its original flat condition are provided in a predetermined pattern PP1, PP2, respectively. To the sides 2A and 2B of said core 2 has likewise been attached face sheets 103 and 104. In this embodiment the core 2 as well as the face sheets 103, 104 have been curved into cylindrical shape and have been connected at one edge so as to form a generally tubular shape that may have many areas of application, such as structural pillars, antenna towers etc.

Like before, the metal face sheets 103, 104 are each provided with apertures 120, 121 that in this case are provided in predetermined patterns AP3 and AP4, respectively. The apertures 120 of the metal face sheet 103 that in the finished panel 101 is secured to an outer, in the cylindrical configuration, side 2A of the core 2 are provided in a predetermined pattern AP3 that is adapted to the positions of the outer protrusions 10 in the cylindrical configuration of the core 2. Furthermore, the apertures 121 of the metal face sheet 104 that in the finished panel 101 is secured to an inner, in the cylindrical configuration, side 2B of the core 2 are provided in a predetermined pattern AP4 that is adapted to the positions of inner protrusions 11 in the cylindrical configuration. The reason for these modified aperture patterns AP3 and AP4 is that during the curving of the core 2 its material will be deflected so that the outer protrusions 10 will become angled outwardly, angle α1, from each other and the inner protrusions 11 will become angled inwardly, angle α2, towards each other, as compared to in the original developed or flattened shape where the protrusions are generally parallel and equally spaced at their outer ends.

In particular, employing the honeycomb core material fabricated in accordance with International PCT-application No. WO/2010/069363, the curving thereof is preferably facilitated by allowing the material folds forming the inner, lower protrusions 11 to open up by an appropriate angle α3, as is illustrated for the inner protrusion to the right in FIG. 7.

In other words, as seen in FIG. 7, in the face sheet 103 that is secured to the core 2 outer side 2A the apertures 120 are separated further, distance D1, from each other in the circumferential direction of the finished structure 101 than the distance D2 between apertures 121 in the other face sheet 104 that is secured to the core 2 inner side 2B. Expressed otherwise, the apertures 120, 121 are generally unequally spaced/distributed in their aperture patterns AP3, AP4, respectively. The same basic principles as those described for the cylindrical embodiment also apply to an arcuate or otherwise curved structure (not illustrated).

In FIGS. 8-11 is shown a further, third embodiment of an inventive sandwich structure 201 that is basically the same as the embodiment of FIGS. 1-4, with the exception that it is a semi-sandwich structure having only one face sheet 3 secured to the core material 202 with its lower side 3B engaging one side 202A of the core 202. The other side 202B of the core 202 is uncovered so that the cells 202C formed thereby are left open at that side. Accordingly, the core 202 preferably only has protrusions 10 formed in a pattern PP at said one covered side 202A, for cooperation with apertures 20 arranged in a corresponding pattern AP in the single face sheet 3. As was indicated above, FIGS. 10 and 11 also illustrate the two variants of the welded or otherwise produced joints W and W', respectively. This type of semi-sandwich structure having a face sheet at only one side of the core may likewise be used for the cylindrical or arcuate type of structure disclosed in FIGS. 5-7.

Finally, FIGS. 12A-B and 13A-B illustrate two further exemplary embodiments of inventive sandwich structures 301, 401. They serve to clarify that for the purposes of the invention it is likewise possible to use other core materials than the specific honeycomb materials that have so far been used to explain the invention. In the illustrated forth and fifth embodiments the alternative cores 302, 402 consist of materials having parallel, channel-like corrugations 302C and 402C, respectively. The corrugations 302C, 402C are open in generally opposite directions and are closed at least at one side, in the illustrated embodiments at both sides, by a face sheet 303, 304 and 403, 404, respectively. In these illustrated core material embodiments with corrugations/channels that in cross section have curved 302 and right angled 402 walls, respectively, and that are closed at both sides 302A, 302B and 402A and 402B, respectively, the channels/corrugations may additionally serve the purpose of conducting flowing media, such as for cooling purposes.

In this type of "corrugated" sandwich core material 302, 402 the protrusions 310, 311 and 410, 411, respectively, may be formed in the core material in optional manners, such as by punching out and bending flaps of appropriate shape in the actual core material or even by separately attaching protrusions to the core material in the appropriate patterns. Like before, the sizes and dimensions of the apertures 320, 321 and 420, 421 are adapted to those of the protrusions 310, 311 and 410, 411 of the respective core 302, 402, to thereby allow easy insertion of the protrusions into the corresponding apertures.

In view of the above description it shall now be clear that for the production of sandwich structures of the general type including a core formed of profiled metal sheet material and a metal face sheet secured to one or each side of the core, the invention basically suggests that protrusions are formed in a predetermined pattern on one or both sides of the core. Furthermore apertures are formed in a predetermined pattern in a single metal face sheet or each metal face sheet to be secured to the core. By forming said apertures with dimensions at least slightly exceeding those of the core protrusions, said protrusions of the core are at least partially extended through the apertures of the associated face sheet or sheets when the respective face sheet or sheets are applied to said one or each side of the core. The entire sandwich structure is then finalized by securing the protrusions of the core to the associated face sheet, such as preferably by welding, brazing or soldering.

This inventive joining of the core and face sheet or sheets is very advantageous both with regard to a high strength structure and to an economical production. This is the result of the joining of the protrusions of the core with the face sheet or sheets from the outside, at an outer side of the respective face sheet that is easily accessible for most joining methods and equipment in a continuous production of running lengths of sandwich panels. The actual methods and equipment suitable for joining the core and face sheets may vary for different applications and is not described in any detail since the appropriate choice would be obvious to a skilled practitioner.

In the generally flat configuration of the sandwich structure the apertures of each face sheet are provided in a pattern where the individual apertures are spaced and distributed generally equally to corresponding protrusions formed in a pattern in an associated side of the core, so that when a face sheet is placed on a side of the core the associated protrusions and apertures are aligned with each other.

On the contrary, when forming a structure having a generally curved or cylindrical shape, apertures and protrusions are formed in a face sheet and in the associated side of the core, so as to be generally unequally spaced and distributed in the respective protrusion and aperture patterns in a developed or flattened initial form of said face sheet and core. The face sheet or sheets and the core are then processed to the intended curved or cylindrical shape. During said processing of the core the deflection of its profiled sheet material will cause protrusions on the outer circumference of the core to diverge outwardly and will cause protrusions on the inner circumference of the core to converge inwardly. The apertures in the corresponding outer and inner face sheets will therefore in this embodiment be provided in patterns where the individual apertures are spaced and distributed generally equally to the corresponding protrusions when the core is in the curved shape. Expressed otherwise, the apertures of a metal face sheet intended for joining to an outer, in the cylindrical configuration, side of the core are provided in a predetermined pattern that is adapted to the positions of outer protrusions in the cylindrical configuration of the core and/or the apertures of a metal face sheet intended for joining to an inner, in the cylindrical configuration, side of the core are provided in a predetermined pattern that is adapted to the positions of core inner protrusions in the cylindrical configuration. Curving of core and face sheets will be performed partly prior to or in association with bringing them together for mutual joining. In a practical embodiment the curving of the core and face sheets will preferably be performed continuously, simultaneously with bringing them together for their mutual joining or securing.

In alternative, but not specifically illustrated embodiments of the invention variations of the different illustrated parts of the inventive panel structures may be employed without departing from the scope of the invention. As an example of this, the scope of the invention covers any appropriate type of sandwich core material that may be formed in optional ways, and with protrusion in the core material formed in the above mentioned, likewise optional manners, such as by the actual profiling of the core material, through punching out and bending flaps of appropriate shape or through separately attaching protrusions to the core material in the appropriate patterns. Likewise, the invention will not be restricted to the described welded, brazed or soldered joints for securing the core to the face sheets, but riveted or even glued joints may be contemplated as long as the joints may be formed from outside the respective face sheet.

The invention has been described in connection with what is presently considered the most practical and preferred embodiments, but it is to be understood that the invention is not limited to the disclosed embodiments. The invention likewise covers any feasible combination of features described and illustrated herein. The invention is therefore intended to cover various modifications and equivalent arrangements included within the spirit and scope of the appended claims.

The invention claimed is:

1. A method of producing a sandwich structure including a core formed of profiled metal sheet material and a metal face sheet secured to one side or a plurality of metal face sheets secured to different sides of the core, the method comprising:
    forming the core by folding a single sheet of material to provide protrusions in a predetermined pattern comprising a grid of the protrusions extending in two dimensions on said one side or on each side of the core, wherein a plurality of the protrusions extend in each of the two dimensions;
    forming apertures in a predetermined pattern in the metal face sheet or the plurality of metal face sheets;
    forming said apertures with dimensions at least slightly exceeding those of said protrusions;
    applying the metal face sheet to said one side of the core or applying the plurality of the metal face sheets to different sides of the core, thereby at least partially extending protrusions of the core through apertures of the associated metal face sheet; and securing the protrusions of the core to said associated metal face sheet by welding, brazing or soldering, wherein the core comprises parallel corrugations, said corrugations comprising a plurality of channels with axes that are parallel to the metal face sheet or sheets and being closed at least at one side by the metal face sheet or sheets, wherein a respective channel of the plurality of channels opens in a direction opposite an adjacent channel, and wherein a respective protrusion of the protrusions is disposed at a base of the respective channel.

2. A method according to claim 1, wherein the welding, brazing or soldering protrusions of the core to an outer side of the respective face sheet is performed from outside the respective metal face sheet.

3. A method according to claim 1, wherein:

the sandwich structure has a generally flat configuration, the apertures and the protrusions are formed so as to be equally spaced and distributed in said respective protrusion and aperture patterns and by placing the metal face sheet or each metal face sheet on the associated side or sides of the core with the respective protrusions and apertures aligned with each other.

4. A method according to claim 1, wherein:

the sandwich structure has a generally curved or cylindrical shape, the apertures are formed for joining to an outer, in the cylindrical configuration, side of the core in a predetermined pattern that is adapted to the positions of outer protrusions in the cylindrical configuration of the core and/or the apertures are formed for joining to an inner, in the cylindrical configuration, side of the core in a predetermined pattern that is adapted to the positions of inner protrusions in the cylindrical configuration of the core and by curving the core and the face sheet or sheets partly prior to or in association with bringing them together for mutual joining.

5. A method according to claim 4, wherein the predetermined pattern of the apertures of the outer, in the cylindrical configuration, side of the core comprises a first distance between respective apertures in a direction of curvature of the cylindrical configuration, and wherein the predetermined pattern of the apertures of the inner, in the cylindrical configuration, side of the core comprises a second distance, smaller than the first distance, between respective apertures in the direction of curvature of the cylindrical configuration.

6. A method according to claim 1, wherein partially extending protrusions of the core through the apertures of the associated metal face sheet comprises extending the protrusions of the core past an outer side of the associated metal face sheet, and wherein securing the protrusions of the core to said associated metal face sheet comprises melting at least a part of a respective protrusion extending past the outer side of the associated metal face sheet into a corresponding surrounding respective aperture.

7. A method according to claim 6, wherein melting at least the part of the respective protrusion extending past the outer side of the associated metal face sheet into the corresponding surrounding respective aperture creates a joint with an external surface substantially flush with the outer side of the associated metal face sheet.

8. A method according to claim 1, wherein the respective channel comprises a first portion substantially parallel to the metal face sheet or sheets and a second portion substantially perpendicular to the metal face sheet or sheets, and wherein the first portion comprises the respective protrusion.

\* \* \* \* \*